United States Patent [19]

Keba et al.

[11] Patent Number: 5,673,197

[45] Date of Patent: Sep. 30, 1997

[54] APPARATUS AND METHOD FOR UPDATING THRESHOLDS FOR PEAK AND VALLEY SYSTEMS

[75] Inventors: James Michael Keba, Wellington; Clinton C. Powell, II, Lake Worth, both of Fla.

[73] Assignee: Motorola, Inc., Schaumburg, Ill.

[21] Appl. No.: 495,857

[22] Filed: Jun. 28, 1995

[51] Int. Cl.⁶ .................................................. G06F 19/00
[52] U.S. Cl. ............................................ 364/487; 364/554
[58] Field of Search .................................. 364/487, 480, 364/554, 570, 574, 575; 375/1, 287, 316, 317

[56] References Cited

U.S. PATENT DOCUMENTS 4,943,974  7/1990  Motamedi ............................. 375/1
5,425,056  6/1995  Maroun et al. ....................... 375/316

Primary Examiner—Emanuel T. Voeltz
Assistant Examiner—M. Kemper
Attorney, Agent, or Firm—Philip P. Macnak

[57] ABSTRACT

An apparatus and method for updating upper and lower thresholds in peak and valley systems. The apparatus includes comparators which determine which peaks or valleys are eligible for use in the calculation of upper or lower threshold levels. The comparators output the eligible peaks and valleys into statistical blocks that calculate the mean of the peaks and valleys as well as the deviation over a predetermined number of samples. Additional comparators compare either the mean deviation, standard deviation, or variance of the eligible peaks and valleys to predetermined deviation thresholds to determine whether the mean peak or mean valley should be used to calculate update thresholds. The apparatus further includes memory elements that store the mean peak or mean valley values used in the calculation of upper or lower thresholds.

17 Claims, 6 Drawing Sheets

APPARATUS AND METHOD FOR UPDATING THRESHOLDS FOR PEAK AND VALLEY SYSTEMS

FIELD OF THE INVENTION

The present invention relates generally to an apparatus and method for updating peak and valley thresholds that utilizes the mean deviation, standard deviation or variance of selected peak and valley signals to provide more accurate update thresholds in the presence of signal quality impairments.

BACKGROUND OF THE INVENTION

In radio frequency (RF) receiving devices it is common to design a decoder within the receiver that deciphers information encoded on a carrier signal by a transmitter. One method of decoding is based upon comparing a received signal with predetermined upper, lower, and middle thresholds to determine where the signal lies with respect to each threshold and thereby decode its symbol value. However, the accuracy of this method is directly related to the accuracy of the thresholds used and therefore establishing proper thresholds is fundamental. Furthermore, threshold values are not constant and need to be periodically updated due to changing atmospheric conditions and other signal quality impairments. These impairments affect the magnitude of the received signal and the threshold update process, which ultimately can produce errors in the decoding process. Accordingly, a method of accurately updating the thresholds used to decode received signals is of critical importance in these RF receivers.

One example of a device which relies on accurate thresholds to decode a received signal is a paging receiver. In a paging system, paging signals are transmitted from a paging transmitter to a multiplicity of portable, battery operated paging receivers according to a pre-specified modulation format including, for example, serialized digitally coded sync, address, and message data words. Each paging receiver includes an input stage which receives, demodulates, and converts the paging signal into an analog signal having a varying AC content which is representative of the serialized digitally coded modulated data of the paging signal.

The next stage of the paging receiver, commonly referred to as the decoder section, compares the received analog signal in time with one or more threshold values, which in the ideal case, are intended to be set at mid points between expected received signal values of the analog signal. Depending upon the comparison of the received signal with each of the thresholds a symbol value is generated. In turn, the successive symbol values correspond to the serially generated multilevel states representing groups of bits of the digitally coded words of the paging signal.

When a four level decoder is used, all input signals will be in one of four regions. The first region is above the upper threshold, the second region is between the upper threshold and a middle threshold, the third region is between the middle threshold and a lower threshold and the fourth region is below the lower threshold. Preferably, the middle threshold is set halfway between the upper and lower thresholds. The placement of each threshold value ultimately determines what region each input signal falls within and the corresponding symbol that is generated. Accordingly, an incorrect threshold could result in an incorrect symbol value.

Prior art upper and lower threshold updating apparatus have been implemented in both software and hardware or a combination of both. In general, these devices start with predetermined upper and lower threshold values. To update threshold values, the prior art apparatus acquires a predetermined number of peak and valley samples. Specifically, eight peak or eight valley samples which exceed the predetermined upper or lower threshold respectively are acquired and then the mean peak value (PEAK) and the mean valley value (VALLEY) are calculated. The upper threshold (THUPP) is then set equal to the VALLEY +⅝ (PEAK−VALLEY). Similarly, the lower threshold (THLOW) is then set equal to PEAK−⅝ (PEAK−VALLEY). Thereafter, the upper and lower thresholds (THUPP and THLOW) are used to determine which signals will be used in subsequent PEAK and VALLEY calculations.

A prior art threshold update circuit block diagram is shown in FIG. 1. As can be seen, an input signal is received from the discriminator output of the receiver and is input into comparator (COMP-1). COMP-1 compares the value of the input signal to the upper threshold and if the input signal is greater than the upper threshold a counter is incremented and the input signal is passed into a mean peak calculator. When the counter reaches eight the mean peak calculator divides the sum of the eight peak signal values contained therein by eight and outputs an updated mean peak value to the threshold calculator. The threshold calculator then calculates updated upper, lower, and middle thresholds based upon the mean peak value and the mean valley value which is received from the mean peak calculator circuit. Thereafter, the new upper threshold (THUPP) is fed back to COMP-1 for use in future peak decisions.

In a similar manner, the input signal from the discriminator output is compared with the lower threshold and if the input signal is less than the threshold a second comparator (COMP-2) passes the input signal to a second mean calculator and a second counter is incremented. When the second counter reaches eight the mean calculator divides the sum of the eight valley values by eight and outputs the mean valley value to the threshold calculator. Subsequently, updated upper, lower, and middle thresholds are calculated based upon the mean peak and valley values and the updated lower threshold is fed back to COMP-2 for use in future valley decisions.

Determination of upper, lower, and middle thresholds in the absence of signal quality impairments such as low signal to noise ratio, simulcast distortion, or Raleigh fading is extremely accurate using the above-mentioned mean peak and mean valley techniques. However, an extremely accurate threshold is not essential under these conditions due to the excellent separation of the received signal levels from the noise. On the other hand, determination of upper, lower, and middle thresholds in the presence of a signal quality impairment is not accurate when using the established mean peak and mean valley techniques alone, even when the eight point averaging technique is used. Unfortunately, this is precisely when an accurate upper, lower, or middle threshold is needed due to the poor separation between the received signal and the background noise.

The shortcoming of the prior art is that signal quality impairments are not detected or eliminated in the process of calculating updated upper, lower, and middle thresholds. Consequently, input signals containing impairments are used in the determination of threshold values and thus can significantly increase the bit error rate of the symbol values representative of the input signal. As a result, input signals are more susceptible to being incorrectly decoded into their corresponding symbol values. Additionally, an incorrect threshold is used for at least eight samples since a new upper, lower, or middle threshold will only be calculated after eight new peaks or valley samples are acquired respectively. Moreover, all interim data samples acquired by the receiver are susceptible to improper decoding.

Accordingly, there is a present need for a threshold update apparatus that can provide an accurate upper, lower, and middle threshold in the presence of signal quality impairments. Furthermore, there is a present need for a threshold update apparatus that updates the upper, lower, and middle thresholds on a more frequent basis.

SUMMARY OF THE INVENTION

The threshold update method and apparatus of the present invention solves the problems encountered by the prior art by the provision of a novel threshold update method and apparatus that utilizes the mean deviation, standard deviation or variance of selected peak and valley signal samples to better calculate the update thresholds which are used in determining future selected peaks and valleys. The method and apparatus set forth herein are both directed toward updating upper, lower, and middle thresholds only when the received signal is in good quality thereby avoiding the skewing effects and the resulting incorrectly decoded data caused by signal quality impairments. In short, by using the mean deviation, standard deviation or variance of peak and valley signals it is possible to determine when a received signal is of poor quality. A high mean deviation, standard deviation or variance indicates the signal is impaired and the thresholds should not be updated. On the other hand, a low mean deviation, standard deviation or variance indicates that the signal is in good quality and the thresholds should be updated. Accordingly, temporary signal impairments will not affect the determination of either upper, lower, or middle threshold values.

The present invention also provides an upper, lower, and middle threshold update apparatus in which each threshold can be updated after each new peak or valley is acquired. As a result, signal quality impairments or inaccurate thresholds do not have a sustained effect on the decoder.

In accordance with these and other objects which will become apparent hereinafter, the instant invention will now be described with particular reference to the accompanying drawings.

DESCRIPTION OF THE PREFERRED EMBODIMENT

With reference to FIGS. 2–6, there is depicted an improved apparatus and method for updating both the upper, lower, and middle thresholds of a detection decoder used in an RF receiver. The apparatus 10 is comprised of input comparators 12, 16, 22, and 26, statistical blocks 14 and 24, and memory elements 18 and 28.

Figure 1:
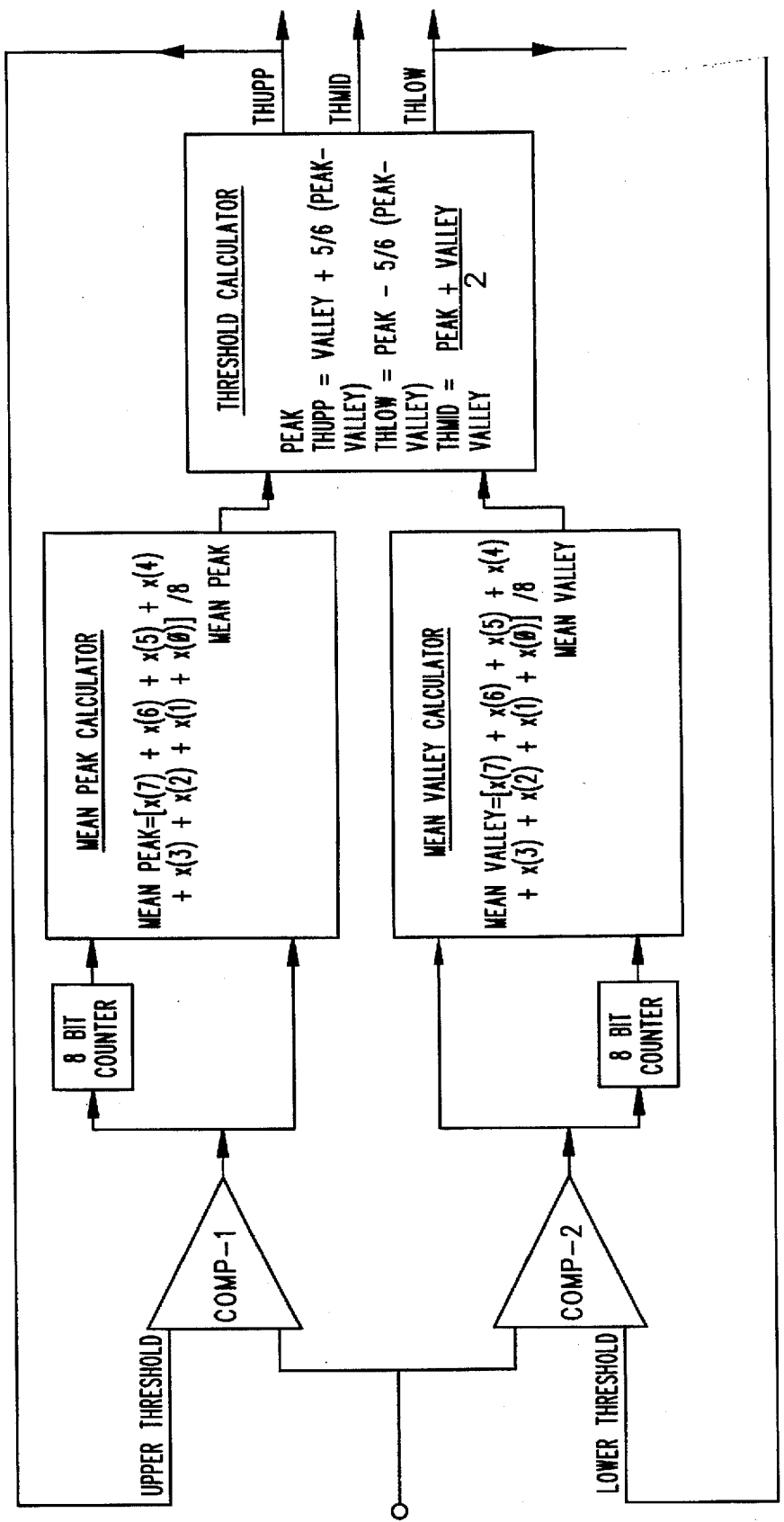
FIG. 1 is a block diagram of a portion of a typical prior art threshold update apparatus.
Figure 2:
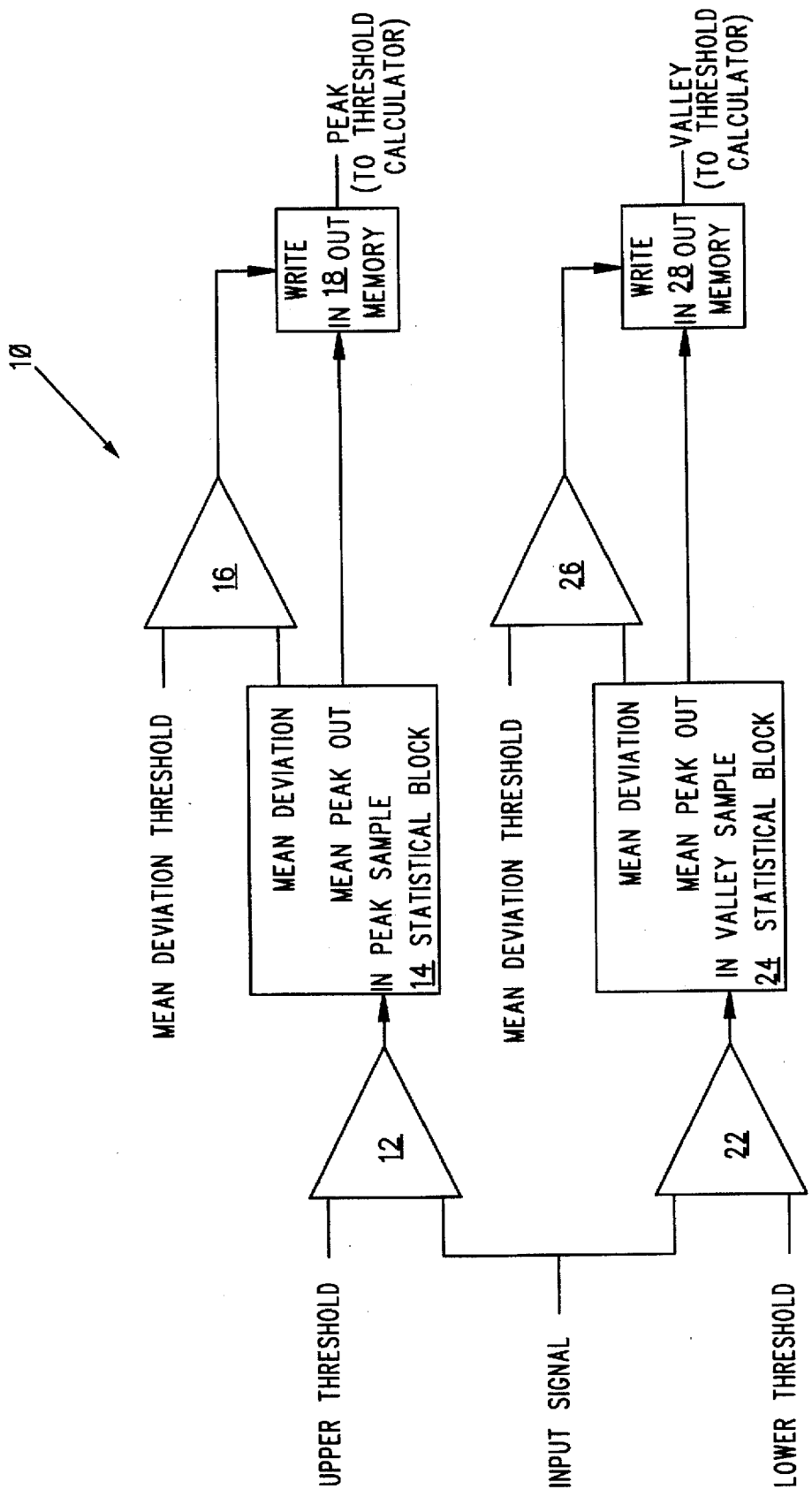
FIG. 2 is block diagram of the threshold update apparatus of the present invention.

As shown in FIG. 2 comparator 12 is employed at the upper threshold section of apparatus 10. Comparator 12 compares the magnitude of the input signal with the magnitude of the upper threshold and if the input signal is greater than the upper threshold the comparator allows a sample of the signal to be output into statistical block 14. On the other hand, if the input signal is lower than the upper threshold, the input signal is not passed through comparator 12.

Statistical block 14 performs two primary functions. First, block 14 calculates the mean of a predetermined number of the most recent peak samples that have entered the block. For example, if the predetermined number of samples is set at eight, block 14 will calculate the mean of the last eight peak values that have been received. This ensures the upper threshold is accurate during the time it is in use since it is based upon the most recent peak samples.

The second primary function of block 14 is to calculate either the mean deviation, standard deviation or variance of the samples used to calculate the mean. In the preferred embodiment, statistical block 14 calculates the mean deviation of the samples used to calculate the mean. The term mean deviation as stated herein is defined as the sum of a predetermined number of deviations divided by the number of deviations summed where a deviation is defined as the absolute value of a peak value minus the mean. The mean deviation is set forth in mathematical terms in FIG. 4.

The mean peak value output from block 14 is input into memory element 18. However, not all mean peak values input into memory 18 are written therein. In the preferred embodiment the mean deviation output from statistical block 14 is input into comparator 16 where it is compared with a predetermined mean deviation threshold. If the mean deviation is greater than the predetermined threshold, comparator 16 interprets this condition to mean that a signal quality impairment is present and the mean peak value calculated should not be used to update thresholds. On the other hand, if the mean deviation is less than the predetermined threshold, comparator 16 outputs a write enable signal to memory element 18. In this case, memory element 18 writes the mean peak value at its IN port into its internal register. Accordingly, that mean peak value will be used when calculating the updated thresholds.

In the preferred embodiment the mean deviation, standard deviation or variance is a fixed predetermined value. However, it is realized that this value could be changed if the RF receiver was operated on the fringe of its range for an extended period or time or was located in some other environment that increased the standard deviation, variance, or mean deviation for an extended period of time.

The lower threshold section of apparatus 10 is also shown in FIG. 2. As in the upper threshold section, the input signal is taken from the discriminator output section of the receiver (not shown). Comparator 22 compares the magnitude of the input signal with the magnitude of the lower threshold and if the input signal is less than the lower threshold the comparator allows the signal to be input into statistical block 24.

Statistical block 24 performs two primary functions similar to block 14. The first primary function of block 24 is to calculate the mean of a predetermined number of the most recent valley samples that have entered block 24. For example, if the predetermined number of samples is set at eight, block 24 will calculate the mean of the last eight valley values that have been received. The second primary function of block 24 is to calculate either the mean deviation, standard deviation or variance of the samples used to calculate the mean valley value. In the preferred embodiment, statistical block 24 calculates the mean deviation of the samples used to calculate the mean valley. The mean deviation is calculated in the same manner as in statistical block 14 discussed above except that each deviation is the absolute value of a valley value minus the mean valley value. The equation for the mean deviation is set forth in FIG. 5.

The mean valley value output from block 24 is fed into memory element 28. As in the previous discussion, not all mean valley values input into memory element 28 are written therein. In the preferred embodiment the mean deviation output from statistical block 24 is input into comparator 26 where it is compared with a predetermined mean deviation threshold. If the mean deviation is greater than the predetermined threshold, comparator 26 interprets this condition to mean that a signal quality impairment is present and the mean valley value calculated should not be used to update thresholds. On the other hand, if the mean deviation is less than the predetermined threshold, comparator 26 outputs a write enable signal to memory element 28. In this case, memory element 28 writes the value present at its IN port into its internal register. Accordingly, that mean valley value will be used when calculating the updated thresholds.

In the preferred embodiment, statistical blocks 14 and 24 each comprise two separate calculation devices. The first device is simply a mean peak calculator or a mean valley calculator, depending on whether it is used in the upper or lower portion of the update circuit, respectively. As discussed above, the mean peak or valley calculator sums a predetermined number of either peak or valley samples and then divides by the number of samples added. Preferably, this will be accomplished with a shift register, summer, and divider, all of which are commercially well known and available. In this arrangement, a shift register (n) samples wide accepts a new peak or valley sample into its X(0) location and shifts the prior X(0) value into an X(1) position. Subsequent shifts will continue until the X(n−1) value is bumped out of the register. As a result, the shift register will contain the values of the (n) most recent peak or valley sample values. In turn, these values are loaded into the summer where they are added and then divided by (n).

Figure 3:
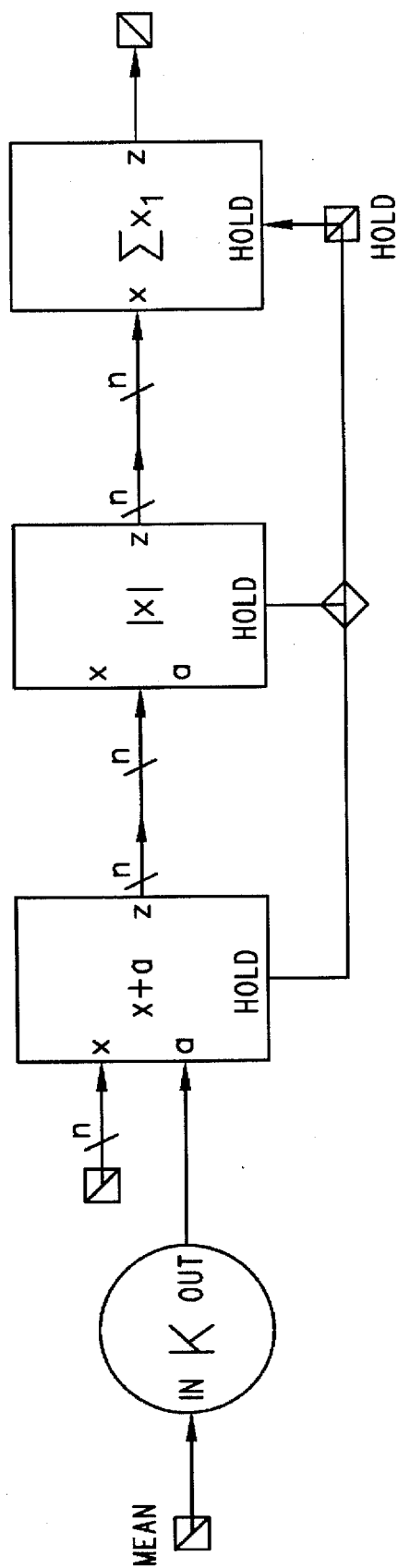
FIG. 3 is a block diagram of the mean deviation calculator of the present invention.

The second calculation device present in both statistical blocks 14 and 24 of the preferred embodiment is a mean deviation calculator. As shown in FIG. 3, the mean deviation calculator is comprised of several subelements. At its input, the mean deviation calculator receives either the output of the mean peak calculator or the mean valley calculator, depending upon which calculator circuit it is being incorporated within. Additionally, the mean deviation calculation circuit receives a vector X of length (n) containing samples of either peak or valley samples which have been passed by comparators 12 or 22, respectively. These vectored peaks or valleys are readily available from either the peak shift register (not shown) or the valley shift register (also not shown) respectively. In operation, the mean deviation calculation circuit multiplies either the mean peak or mean valley output by minus one (k=−1), thereby changing its sign, and then adds it to each sample in the input vector X. Subsequently, the absolute value of each resultant value from the additions is taken and the vector is passed into a summation device which reduces the vector to a scaler quantity. Although not shown, this scaler quantity can be divided by (n) the number of samples contained within input vector X. When divided by (n), the resulting output is equal to the mean deviation.

Another important feature of this invention is the ability to update the upper, lower, and middle thresholds after each new peak or valley sample is acquired. Since each new peak or valley is loaded into a shift register on a sample by sample basis, the (n) most recent samples are available for calculating the mean peak or mean valley values. This is a significant improvement over prior art threshold update apparatus which calculated the mean peak or mean valley after all (n) samples were acquired.

Additionally, it is important to note that both the upper and lower thresholds decay toward the DC level of the input signal over time. This ensures that a relatively high upper threshold or a relatively low valley threshold does not remain in effect for a sustained period of time. Rather the decay feature requires the thresholds to be updated on a regular basis even if there is no change in the mean peak or mean valley values.

Figure 4:
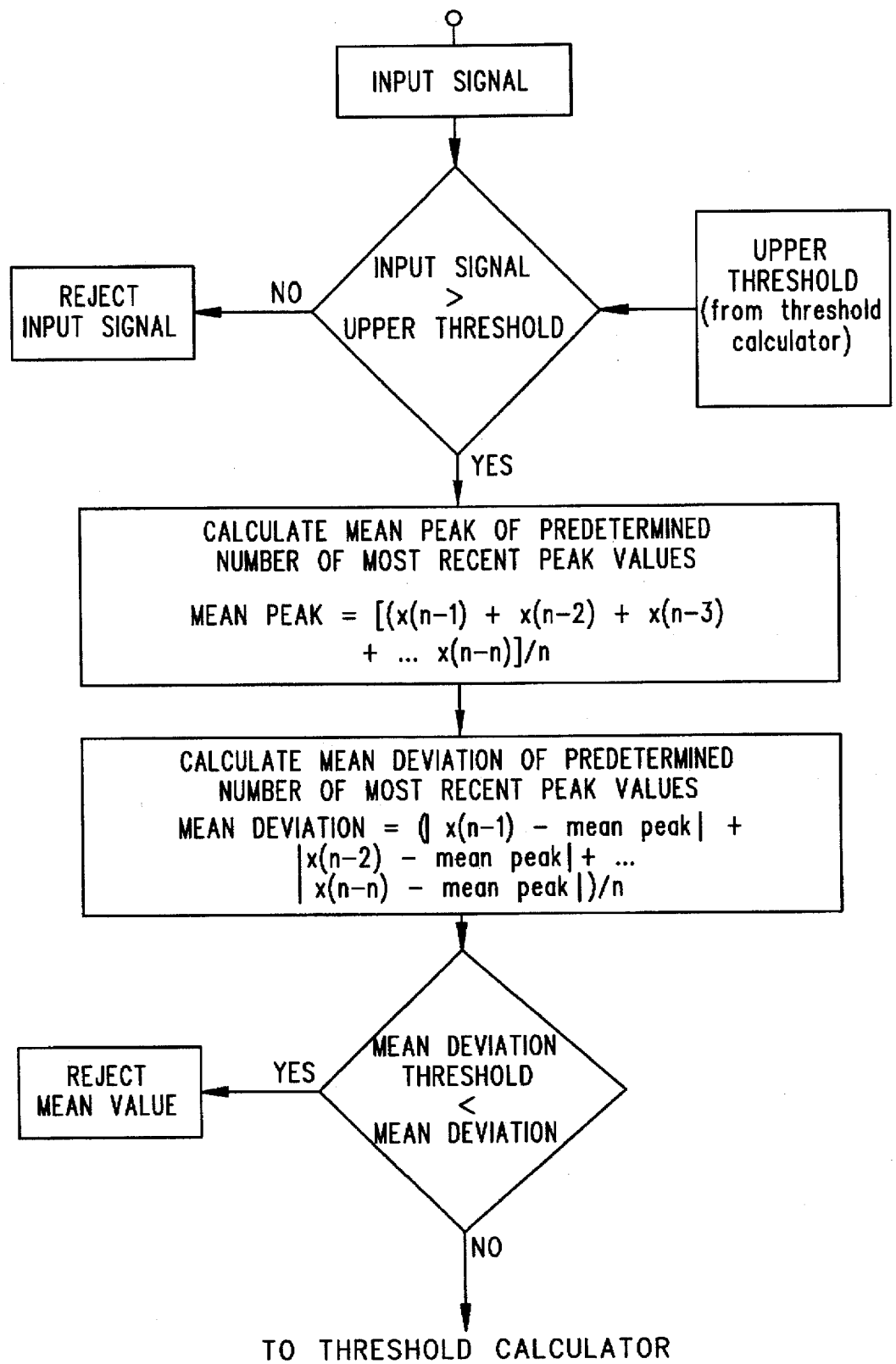
FIG. 4 is a flow chart of the improved peak detector.

FIG. 4 sets forth the method for calculating a peak. The first step in calculating a peak is to acquire an input signal. Second, the input signal is compared with the upper threshold and if it is found to be less than the upper threshold, the input signal is rejected. On the other hand, if the input signal is greater than the upper threshold, it is stored in a memory element. The third step is to calculate the mean of a predetermined number (n) of most recent peak samples that are stored in the memory element in step two. The mean peak is determined by summing the predetermined number (n) of most recent peak samples stored in the memory element 18 and dividing the sum by the number of samples (n). The fourth step is to calculate the mean deviation of the predetermined number (n) of most recent peak value samples. In order to calculate the mean deviation of these samples, it is necessary to calculate the deviation of each sample. The deviation of each sample is the absolute value of the difference between the peak sample value and the mean peak calculated in step three. The deviation of each of the (n) samples from the mean peak is then summed and divided by (n) to yield the mean deviation. Step five involves comparing the calculated mean deviation to a predetermined mean deviation threshold. If the calculated mean deviation is greater than the mean deviation threshold, the mean peak value calculated in step three is rejected. On the other hand, if the calculated mean deviation is less than the predetermined mean deviation threshold the mean peak value is used in the calculation of updated upper, lower, and middle thresholds.

Figure 5:
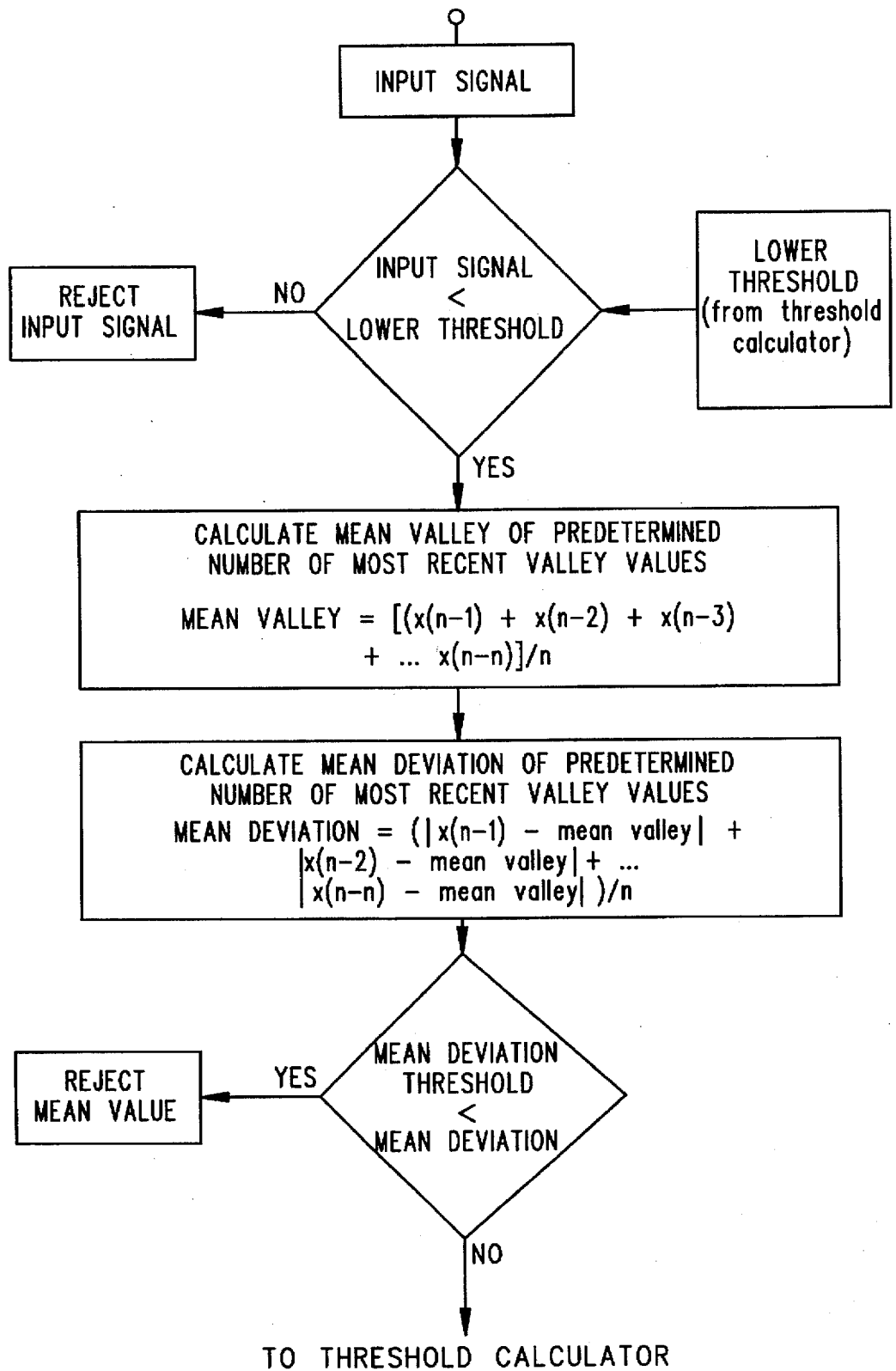
FIG. 5 is a flow chart of the improved valley detector.

FIG. 5 sets forth the method for calculating valley. As before, the first step in calculating valley is to acquire an input signal. Second, the input signal is compared with the lower threshold and if it is found to be greater than the lower threshold, the input signal is rejected. On the other hand, if the input signal is less than the lower threshold, it is stored in a memory element step. The third step is to calculate the mean of a predetermined number (n) of most recent valley samples that are stored in the memory element in the second step. The mean valley is determined by summing the predetermined number (n) of most recent valley samples stored in the memory element and dividing the sum by the number of samples (n). The fourth step is to calculate the mean deviation of the predetermined number (n) of most recent valley samples. In order to calculate the mean deviation of these samples, it is necessary to calculate the deviation. Similar to the discussion above, the deviation of each sample is the absolute value of the difference between the valley sample value and the mean valley calculated in step three. The deviation of each of the (n) samples from the mean valley is then summed and divided by (n) to yield the mean deviation. Step five involves comparing the calculated mean deviation to a predetermined mean deviation threshold. If the calculated mean deviation is greater than the mean deviation threshold, the mean valley value calculated in step three is rejected. On the other hand, if the calculated mean deviation is less than the predetermined mean deviation threshold the mean valley value is used in the calculation of updated upper, lower, and middle thresholds.

The outputs of FIGS. 4 and 5 are then used to calculate the updated thresholds. These updated thresholds are then used in future peak and valley determinations.

The methods described in FIGS. 4 and 5 both employ the mean deviation statistical function. However, it is realized that either the standard deviation of variance may be used in place thereof.

Figure 6:
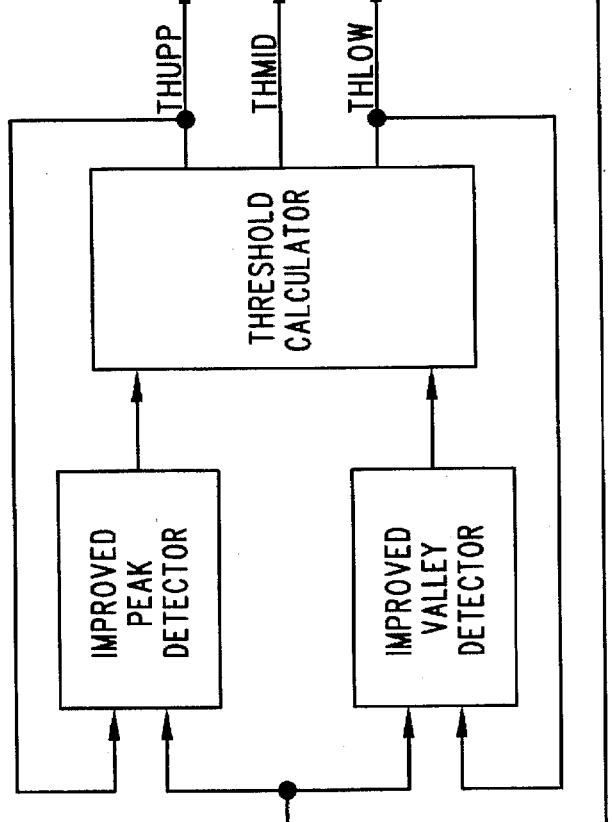
FIG. 6 is a block diagram of the threshold update apparatus of the present invention in an RF receiving circuit.

FIG. 6 depicts the improved peak detector and improved valley detector disposed within a receiver circuit that employs a four-level symbol decoder. The block labeled "improved peak detector" is intended to represent comparator 12, statistical block 14, comparator 16, and memory element 18. The block labeled "improved valley detector" is intended to represent comparator 22, statistical block 24, comparator 26, and memory element 28.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An improved detection decoder comprising:

first means for detection, said first means for detection coupled to an input signal and to an upper threshold signal for detecting a peak signal magnitude and producing a peak output signal corresponding thereto;

second means for detection, said second means for detection coupled to said input signal and to a lower threshold signal for detecting a valley signal magnitude and producing a valley output signal corresponding thereto;

first means for computing, said first means for computing coupled to said first means for detection and receiving said peak output signal, said first means for computing calculating a first mean value of said peak output signal, said first means for computing further calculating a deviation of said peak output signal over a predetermined time interval and producing a peak deviation output signal corresponding thereto;

second means for computing, said second means for computing coupled to said second means for detection and receiving said valley output signal, said second means for computing calculating a second mean value of said valley output signal, said second means for computing further calculating a deviation of said valley output signal over a predetermined time interval and producing a valley deviation output signal corresponding thereto;

first means for comparing, said first means for comparing coupled to said first means for computing and comparing said peak deviation output signal to a first predetermined deviation threshold, said first means for comparing producing a first deviation output signal;

second means for comparing, said second means for comparing coupled to said second means for computing and comparing said valley deviation output signal to a second predetermined deviation threshold, said second means for comparing producing a second deviation output signal; and means for updating said upper and lower threshold signals, said means for updating said upper and lower threshold signals coupled to said first and second deviation output signals and coupled to said first and second mean value, whereby in use said first deviation output signal and said second deviation output signal are used by said means for updating said upper and lower threshold signals to determine whether said first mean value and said second mean value are used to update said upper and lower threshold signals in said detection decoder.

2. The improved detection decoder as set forth in claim 1 wherein said first means for computing and said second means for computing calculate a mean deviation of said peak output signal and a mean deviation of said valley output signal respectively.

3. The improved detection decoder as set forth in claim 1 wherein said first means for computing and said second means for computing calculate a standard deviation of said peak output signal and a standard deviation of said valley output signal respectively.

4. The improved detection decoder as set forth in claim 1 wherein said first means for computing and said second means for computing calculate a variance of said peak output signal and a variance of said valley output signal respectively.

5. An apparatus for updating thresholds in a radio frequency detection decoder system comprising:

a first comparator, said first comparator performing a comparison between an input signal and a first predetermined threshold, said first comparator producing a first output signal based upon said comparison;

a second comparator, said second comparator performing a comparison between said input signal and a second predetermined threshold, said second comparator producing a second output signal based upon said comparison;

means for determining a first mean value, said means for determining a first mean value coupled to said first comparator and receiving said first output signal and determining a first mean value thereof, said means for determining a first mean value generating a first mean value output signal;

means for determining a second mean value, said means for determining a second mean value coupled to said second comparator and receiving said second output signal and determining a second mean value thereof, said means for determining a second mean value generating a second mean value output signal;

means for determining a first deviation, said means for determining a deviation coupled to said first comparator and said means for determining a first mean value, said means for determining a first deviation receiving said first output signal and said first mean value output signal and determining a deviation between said first output signal and said first mean value output signal, said means for determining a deviation generating a first deviation output signal;

means for determining a second deviation, said means for determining a second deviation coupled to said second comparator and said means for determining a second mean value, said means for determining a second deviation receiving said second output signal and said second mean value output signal and determining a deviation between said second output signal and said second mean value output signal;

a third comparator, said third comparator coupled to said means for determining a first deviation, said third comparator performing a third comparison between said first deviation output signal and a first predetermined deviation threshold, said third comparator producing a third output signal based upon said third comparison;

a fourth comparator, said fourth comparator coupled to said means for determining a second deviation, said fourth comparator performing a fourth comparison between said second deviation output signal and a second predetermined deviation threshold, said fourth comparator producing a fourth output signal based upon said fourth comparison;

a first memory element, said first memory element coupled to said third comparator and said means for determining a first mean value, said first memory element receiving said first mean value output signal and said first deviation output signal, said first memory element selectively storing said first mean value output signal based upon said third output signal;

a second memory element, said second memory element coupled to said fourth comparator and said means for determining a second mean value, said second memory element receiving said second mean value output signal and said second deviation output signal, said second memory element selectively storing said second mean value output signal based upon said fourth output signal; and means for computing said first and second predetermined thresholds said means for computing coupled to said first and second memory elements, wherein, in use, said first and second predetermined thresholds are a function of said first and second mean value output signals that are selectively stored in said first memory element and said second memory element respectively.

6. The apparatus for updating upper and lower thresholds in a detection decoder system as set forth in claim 5 wherein said means for determining a first deviation and said means for determining a second deviation determines a mean deviation.

7. The apparatus for updating upper and lower thresholds in a detection decoder system as set forth in claim 5 wherein said means for determining a first deviation and said means for determining a second deviation determines a standard deviation.

8. The apparatus for updating upper and lower thresholds in a detection decoder system as set forth in claim 5 wherein said means for determining a first deviation and said means for determining a second deviation determines a variance.

9. In a detection decoder comprising a plurality of comparators, a plurality of memory elements, and means for computation, a method for updating upper and lower threshold signals in a detection decoder comprising the steps of:

(a) acquiring a sample of an input signal;

(b) making a comparison between said sample of said input signal and the upper threshold signal and producing a second signal based on said comparison;

(c) making a second comparison between said sample of said input signal and the lower threshold signal and producing a third signal based on said second comparison;

(d) determining the mean of said second signal on a first periodic basis;

(e) determining the mean of said third signal on a second periodic basis;

(f) determining the deviation of the second signal from the mean of the second signal on said first periodic basis;

(g) determining the deviation of the third signal from the mean of the third signal on said second periodic basis;

(h) comparing the deviation of the second signal from the mean of the second signal with a first predetermined deviation threshold;

(i) comparing the deviation of the third signal from the mean of the third signal with a second predetermined deviation threshold;

(j) updating the upper and lower threshold signals if the deviation of the second signal from the mean of the second signal is less than the first predetermined deviation threshold; and (k) updating the upper and lower threshold signal if the deviation of third signal from the mean of the third signal is less than the second predetermined deviation threshold.

10. The method for updating upper and lower thresholds in detection decoder systems as set forth in claim 9 wherein said deviation is a mean deviation.

11. The method for updating upper and lower thresholds in a detection decoder system as set forth in claim 9 wherein said deviation is a standard deviation.

12. The method for updating upper and lower thresholds in a detection decoder system as set forth in claim 9 wherein said deviation is a variance.

13. An improved detection decoder comprising:

a receiver, said receiver receiving an RF signal and producing a detector input signal;

first means for detection, said first means detecting a peak signal magnitude of said detector input signal and producing a peak output signal corresponding thereto;

second means for detection, said second means detecting a valley signal magnitude of said detector input signal and producing a valley output signal corresponding thereto;

first means for computing, said first means for computing coupled to said first means for detection and receiving said peak output signal, said first means for computing calculating a mean of said peak output signal and producing a mean peak output signal, said first means for computing further calculating a deviation of the peak output signal over a predetermined time interval and producing a peak deviation output signal;

second means for computing, said second means for computing coupled to said second means for detection and receiving said valley output signal, said second means for computing calculating a mean of said valley output signal and producing a mean output signal, said second means for computing further calculating a deviation of the valley output signal over a predetermined time interval and producing a valley deviation output signal;

first means for comparing, said first means for comparing coupled to said first means for computing and comparing said peak deviation output signal to a first predetermined deviation threshold, said first means for comparing producing a first deviation output signal; and second means for comparing, said second means for comparing coupled to said second means for computing and comparing said valley deviation output signal to a second predetermined deviation threshold, said second means for comparing producing a second deviation output signal; and a threshold calculator, said threshold calculator receiving said mean peak output signal, said mean valley output signal, said first deviation output signal, and said second deviation output signal, said threshold calculator producing an upper and lower threshold depending upon said first deviation output signal and said second deviation output signal, respectively.

14. The improved detection decoder as set forth in claim 13 wherein said deviation is a mean deviation.

15. The improved detection decoder as set forth in claim 13 wherein said deviation is a standard deviation.

16. The improved decoder as set forth in claim 13 wherein said deviation is a variance.

17. The improved detection decoder as set forth in claim 1, said means for updating said upper and lower thresholds comprising:

first means for storing, said first means for storing coupled to said first mean value and said first deviation output signal, said first means for storing selectively storing said first mean value based upon said first deviation output signal;

second means for storing, said second means for storing coupled to said second mean value and said second deviation output signal, said second means for storing selectively storing said second mean value based upon said second deviation output signal; and third means for computing, said third means for computing coupled to said first and second means for storing, said means for computing updating said upper and lower threshold signals based on said first and second mean values selectively stored in said first and second means for storing, respectively.

* * * * *

UNITED STATES PATENT AND TRADEMARK OFFICE
CERTIFICATE OF CORRECTION

PATENT NO. : 5,673,197
DATED : September 30, 1997
INVENTOR(S) : Keba, et al.

It is certified that error appears in the above-identified patent and that said Letters Patent is hereby corrected as shown below:

Claim 16, Column 11, line14, after "improved", insert --detection--.

Signed and Sealed this

Twenty-sixth Day of May, 1998

Attest:

BRUCE LEHMAN

*Attesting Officer*       *Commissioner of Patents and Trademarks*